March 24, 1959
H. A. HARTY ET AL
2,878,926
APPARATUS FOR REMOVING ADHERING
MATERIAL FROM BELT CONVEYORS
Filed May 26, 1955
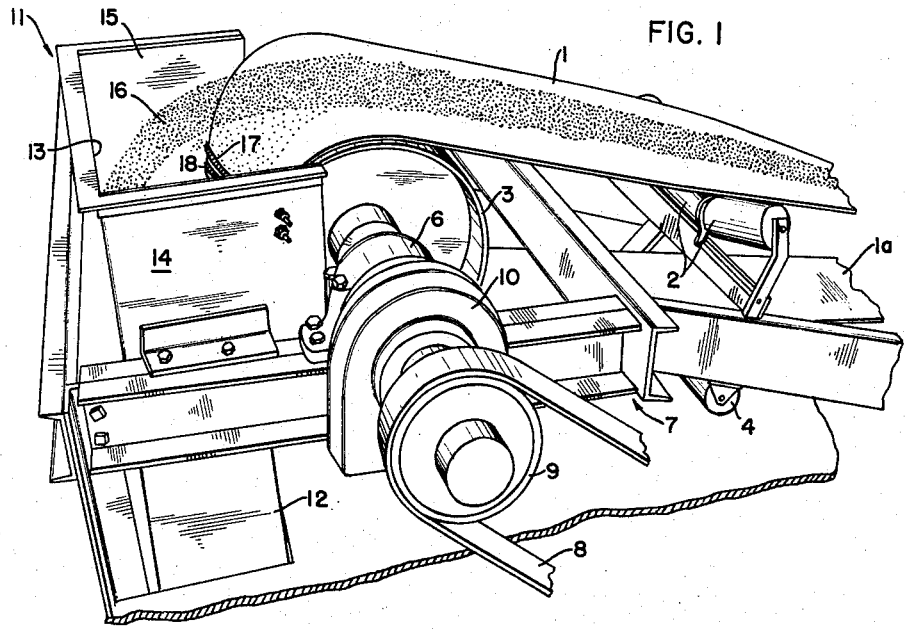
FIG. 1
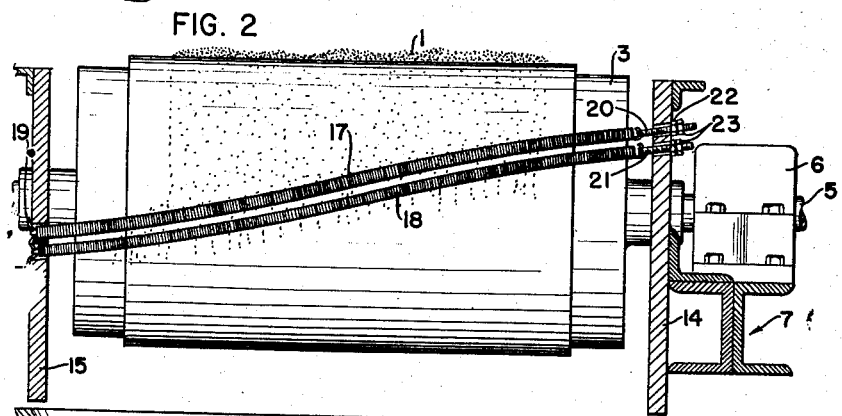
FIG. 2
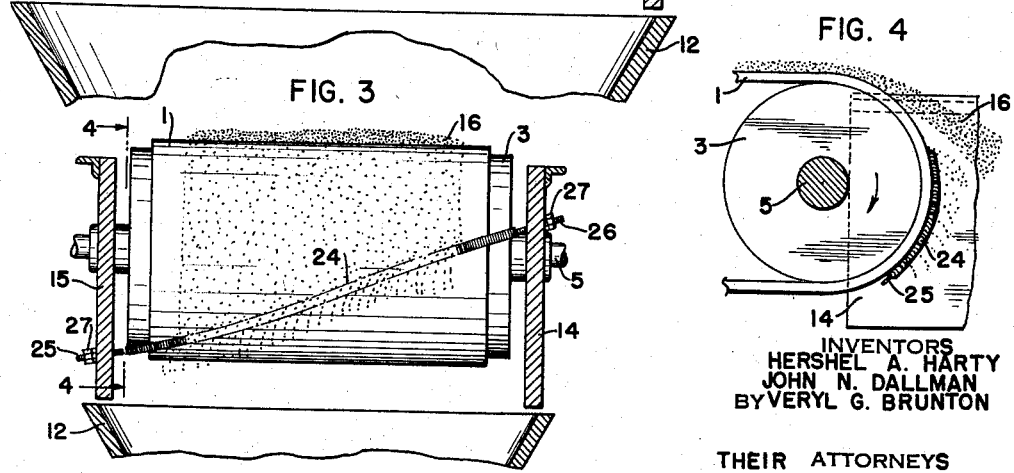
FIG. 3
FIG. 4
INVENTORS
HERSHEL A. HARTY
JOHN N. DALLMAN
BY VERYL G. BRUNTON
THEIR ATTORNEYS ////# United States Patent Office 2,878,926
Patented Mar. 24, 1959

2,878,926
APPARATUS FOR REMOVING ADHERING MATERIAL FROM BELT CONVEYORS

Hershel A. Harty and John N. Dallman, Carlsbad, and Veryl G. Brunton, Loving, N. Mex., assignors to United States Borax & Chemical Corporation, a corporation of Nevada Application May 26, 1955, Serial No. 511,282

3 Claims. (Cl. 198—230)

This invention relates to belt conveyors used for conveying granular or powdered material, and more particularly, to an improved means for removing from the surface of the belt after it has discharged its load, such of the conveyer material as tends to adhere to or cling to the belt.

In the operation of conveyor belts for handling various materials, among which are minerals of various kinds, such for example as the crude ore containing a mixture of salts such as potassium and sodium chloride, a considerable problem has been encountered because of the tendency for a substantial amount of the material to cling to the surface of the belt after the belt has passed around the head pulley at the discharge end of the conveyor. The material clings sometimes in coarse masses, and sometimes the material is of a very fine nature and apparently the tendency to cling is due to electrostatic charge, such belts usually being surfaced with rubber which is a dielectric material. The granular or powdery material clinging to the belt as it rounds and leaves the head pulley, is, in large part, discharged from the return reach of the belt, falling off along the route, and it must be gathered up and returned to the system.

Various attempts have heretofore been made to correct this difficulty. Such mechanisms as wires stretched across the belt and in contact therewith, rotary devices having rubber covered blades arranged to wipe the material from the surface of the belt, and revolving brushes arranged for the same purpose, have been tried, but all mechanisms heretofore devised are objectionable because they do not effectively clean the conveyor belt and are too expensive in first cost or maintenance cost, or both.

The object of the present invention is to overcome these difficulties and provide a means by which the adhering granular material is effectively and economically removed, whether such material is of a coarse or fine nature.

Conveyor belts, if of any considerable length, are made up of sections which are joined together end-to-end by some form of lacing, and another object of the invention is to provide an effective belt wiping means which will not become entangled with, catch or "hang" on such lacing.

In accordance with our present invention the adhering material is removed from the belt after the bulk of the granular material carried by the belt has been discharged and before the belt returns for reloading, by subjecting the conveyor belt to the scraping action of a coil spring which is arranged to extend across the belt after the load material has been discharged from the belt, and discharging the wiped off material into the same receptacle that receives the load material.

The invention will be described more in detail in connection with the accompanying drawings which show, by way of example, the discharge end of a conveyor belt which is adapted to convey potash ore, or salts, and consisting usually of a mixture of potassium and sodium chlorides. In these drawings:

Fig. 1 is a perspective view of the discharge end of the conveyor belt;

Fig. 2 is a vertical sectional view through the hopper taken on a plane which is to the left of the end of the conveyor belt as shown in Fig. 1;

Fig. 3 is a view similar to Fig. 2 but drawn to a smaller scale, and illustrating a modification; and Fig. 4 is a vertical sectional view taken on line 4—4 of Fig. 3.

Referring now to these drawings the conveyor belt 1 which is of conventional construction, consisting of a fabric carcass and rubber facing, is arranged to pass over spaced sets of supporting idler rollers 2 as it travels from the receiving end to the discharge end shown in Fig. 1. Rollers 2, support the belt in the form of a trough, as is customary, to increase its capacity and to prevent the material from being spilled over the sides. At the discharge end the belt passes around a head pulley which is substantially wider than the belt, and after passing around this pulley, the lower reach 1a of the belt returns to the receiving end of the conveyor, being supported by means of spaced sets of rollers 4 in the usual manner.

The head pulley 3 serves to drive the conveyor belt 1 and for this purpose the pulley is keyed to a horizontal shaft 5 (Fig. 2) that is supported in suitable bearings 6 mounted on an appropriate frame work indicated generally by reference numeral 7. Shaft 5 may be driven by any suitable power source, such, for example, as an electric motor (not shown), by means of an endless belt 8 which is trained around a pulley 9. Pulley 9 is customarily keyed to the input shaft of a reduction gearing 10, shaft 5 being the output shaft of such gearing.

At the left of and below the head pulley 3, a hopper 11 is arranged to receive the granular material discharged from belt 1, and below this hopper there may be a chute 12 to convey the granular material to another belt, or into a processing apparatus. These parts are carried by or mounted upon the frame work 7 in any conventional manner.

The hopper 11 has an end wall 13 and two parallel side walls 14 and 15. The velocity imparted to the granular material by belt 1 causes the load material to be thrown to the left of pulley 3 against the end wall 13. Thus the stream 16 of the load material discharged by the belt is thrown free of the surface of the belt soon after the belt commences to curve downwardly around the surface of pulley 3, as indicated in Fig. 1.

In accordance with our invention and for the purpose of scraping the coarse and fine material which adheres or clings to the surface of the belt after the bulk of the granular product or load material is discharged, one or more wiping coil springs such as the springs 17 and 18 are arranged to extend crosswise of the belt between the front and rear side walls 14 and 15 of the hopper, and in such a manner as to make curving contact with the outer surface of belt 1 as it travels down and around pulley 3 after the stream 16 of the load material has left the belt. The springs are stretched angularly across the belt and pulley in the form of a helix so that each spring presses laterally against the belt throughout its entire width (Fig. 2). Such lateral pressure results in an effective wiping or scraping action. The material scraped from the surface of belt 1 by these springs is discharged into the hopper 11 along with the bulk or stream 16 of the material, and before the belt returns to the receiving end of the conveyor.

The diameter of the springs may vary considerably. However, springs having a diameter of about ½ or ⅝ of an inch have been found to be effective in removing both coarse granular material and even potash fines from the surface of the belt. These springs may be mounted approximately 2" between centers in any convenient way, as, for example, in apertures in the side walls 14 and 15. Thus the rear ends of the springs may be secured in the apertures in wall 15 by means of wire anchors 19 passed through hooks or loops formed at the ends of the springs 17 and 18.

The opposite ends of springs 17 and 18 may be attached to a common support which is adjustably mounted in side wall 14, but it is desirable to have the two springs independently adjustable, and consequently they are shown as being attached to the respective inner ends of separate threaded rods 20 and 21. These rods are supported in suitably spaced apertures in the side wall and, at their outer ends, are provided with adjusting nuts 22 and lock nuts 23. The adjusting nuts preferably have rounded or semi-spherical inner ends to engage the peripheries of the apertures, inasmuch as these apertures are not at right angles to the outer surface of wall 14.

It will be understood that the springs 17 and 18 consist of closely wound coils of spring wire. It is necessary to place the springs under some tension in order that they may be held in contact with the surface of the belt 1. The stretching of the springs causes their turns or convolutions to be separated slightly from one another so that each of the springs contacts the belt in a series of narrow areas or traces closely spaced across the belt. By choosing a proper size of spring, proper spacing of the coil turns and a proper angle, a wiping action can be produced which is continuous across the width of the belt, even with a single spring.

By supporting the spring wipers 17 and 18 at an angle other than a right angle to the direction of belt travel, or in other words, askew of the belt or in a non-parallel relation to the axis of pulley 3, the individual convolutions are turned or twisted to some extent with respect to the direction of belt travel, and this may increase the size of the areas of contact with the belt surfaces, or may cause such areas to overlap one another. By employing two springs as shown in Figs. 1 and 2, and by suitably adjusting their relative tensions, the positions of the spaced narrow areas of contact of one spring with the belt can be staggered with respect to the contact areas of the other spring. If desired, the direction of the skew angle of the spring wipers 17 and 18 with relation to the angle of the spring convolutions on the rear sides of the springs and in contact with the belt can be such as to cause the wiped areas of adjacent convolutions to overlap one another.

Referring now to Figs. 3 and 4 of the drawings, a single wiping spring 24 may be employed instead of the two wiping springs 17 and 18.

Spring 24 is attached at its opposite ends to the side walls 14 and 15, like springs 17 and 18. Also, the manner of mounting may be the same, although as shown, spring 24 is supported at each end by a threaded rod, rod 25 supporting the lower end and rod 26 the upper. Adjusting and lock nuts 27 are arranged on each rod.

The angularity of spring 24 with respect to the direction of travel of the belt 1 and also with respect to the axis of shaft 5, is considerably greater than the angularity of wiping springs 17 and 18. The spring angularity is not critical, and Figs. 2 and 3 illustrate a wide range of angular positions of the wiping springs. It will be understood, that the angularity of the single spring 24 will be reduced as shown, for example, in Fig. 2, and that the angularity of springs 17 and 18 may be increased, as shown, for example, in Fig. 3.

Fig. 4 is helpful in showing the curved form which any of the wiping springs 17, 18 and 24 assume when they are stretched across the belt 1 and partially around the pulley 3, thus assuming the form of a helix. The curvature of the belt upon the pulley forces the central portion of any of the springs outward thus causing the springs to be pressed laterally toward or against the surface of the belt, even though, the points of support of the threaded rods 25 and 26, for example, may be in radial alignment with the surface of the pulley 3. It will be understood, however, that these points of support for the opposite ends of springs 17, 18 and 24, are preferably located radially slightly inward from the surface of belt 1 so as to insure that the springs engage the surface of the belt at its marginal portions.

With a single wiping spring it should be wound in a continuous coil throughout its length, that is, throughout the width of the conveyor belt 1. Also, advantageously, the direction of the skew angle with respect to the angle of wind of the spring should be such as to place the areas wiped by adjacent convolutions in overlapping relation. For this reason the spring shown in Fig. 3 is wound in the opposite direction to springs 17 and 18.

It will be understood that inasmuch as the coil wiping springs 17, 18 and 24 are secured in electrical contact with one or both of the side frames 14, 15, they will serve to discharge any electrostatic charge which may tend to accumulate on the material which would otherwise tend to adhere to the belt, or upon the belt surface.

The employment of such wiping spring devices has been found particularly effective in removing both coarse granular material and hard-to-remove potash fines from the surface of conveyor belts which are used to convey potash ores, and, moreover, the wiping springs do not give trouble in catching in or hanging on the belt lacings, probably because of their size and round shape and their yielding and resilient nature.

We claim:

1. In a conveyor belt system, including a pulley and a conveyor belt adapted to carry a granular product load, said belt being arranged to travel around said pulley, means for removing material adhering to the belt after the load is discharged comprising a closely wound, flexible coil spring extending from side-to-side of said belt, and means for stretching said spring at other than a right angle to the direction of belt travel and in contact with the surface of the belt as it travels around said pulley, the individual turns of said stretched spring being spaced apart only to a slight extent.

2. In a conveyor belt system, including a pulley, a discharge hopper associated therewith, and a conveyor belt adapted to carry a granular product load, said belt being arranged to travel around said pulley to discharge said load into the hopper, means for removing material adhering to the belt after the load is discharged comprising a closely wound, flexible coil spring extending from side-to-side of said belt askew to the direction of belt travel, and means for supporting said spring in contact with the surface of said belt as it travels around said pulley, said spring being coiled in a direction to cause the portions of its convolutions facing the belt surface to form traces on said surface which overlap one another.

3. In a conveyor belt system, including a pulley, a discharge hopper associated therewith, and a conveyor belt adapted to carry a granular product load, said belt being arranged to travel around said pulley to discharge said load into the hopper, means for removing material adhering to the belt after the load is discharged comprising a plurality of closely wound, flexible coil springs extending diagonally of said belt, and means for supporting said springs in approximately parallel relation and in contact with the surface of said belt as it travels around said pulley, the individual convolutions of said springs being spaced apart only to a slight extent.

References Cited in the file of this patent

UNITED STATES PATENTS

| | | |
|---|---|---|
| 208,758 | Newton | Oct. 8, 1878 |
| 1,700,851 | Oberhuber | Feb. 5, 1929 |
| 1,843,009 | Wilson | Jan. 26, 1932 |
| 1,875,442 | Greg | Sept. 6, 1932 |
| 2,391,178 | McKnight | Dec. 18, 1945 |
| 2,681,137 | Davis | June 15, 1954 |

FOREIGN PATENTS

| | | |
|---|---|---|
| 801,144 | Germany | Dec. 21, 1950 |